United States Patent [19]
Jansen

[11] Patent Number: 5,533,296
[45] Date of Patent: Jul. 9, 1996

[54] FISHING LURE HEAD

[76] Inventor: Robert W. Jansen, 16115 SW. 117th Ave., Unit A-8, Miami, Fla. 33177-1614

[21] Appl. No.: 377,516

[22] Filed: Jan. 24, 1995

Related U.S. Application Data

[63] Continuation-in-part of Ser. No. 92,827, Jul. 19, 1993, abandoned.

[51] Int. Cl.⁶ .................................................. A01K 85/00
[52] U.S. Cl. ......................... 43/42.36; 43/42.05; 43/44.2
[58] Field of Search ............................. 43/42.36, 42.37, 43/42.38, 42.35, 42.09, 42.08, 42.05, 42.28, 44.2, 44.9, 42.06

[56] References Cited

U.S. PATENT DOCUMENTS

| | | | |
|---|---|---|---|
| 2,102,492 | 12/1937 | Stolley | 43/42.36 |
| 2,625,767 | 1/1953 | Pokras | 43/42.36 |
| 2,756,535 | 7/1956 | Dean | 43/42.36 |
| 2,829,462 | 4/1958 | Stokes | 43/42.36 |
| 3,867,781 | 2/1975 | Wolfe | 43/42.36 |
| 4,163,337 | 8/1979 | Kress | 43/42.36 |
| 5,172,510 | 12/1992 | Lovell, Jr. | 43/42.36 |
| 5,207,016 | 5/1993 | Pate | 43/42.35 |

*Primary Examiner*—Maurina T. Rachuba
*Assistant Examiner*—Chuck Y. Mah
*Attorney, Agent, or Firm*—Malloy & Malloy

[57] ABSTRACT

A head fishing lure including a head formed of substantially strong, solid, yet lightweight material, the head including an axial bore extending through a rear face thereof, the axial bore being adapted to receive a bait fish at least partially therein, and including a small axial opening extending from the front face thereof wherethrough a fishing line is passed. The head includes a surrounding channel disposed in a surrounding side wall surface thereof at a point substantially adjacent a distal end of the head, the channel defining a lip at the distal end of the head whereover an elongate skirt formed of a substantially flexible, resilient, durable material is passed to secure the skirt, which includes an interior diameter substantially equivalent to an exterior diameter of the head at the surrounding channel thereof, to the head, the skirt further being adapted to surround the bait fish inserted into the head such that the bait fish will be substantially protected during use and accordingly be useable for an extended period of time.

19 Claims, 1 Drawing Sheet

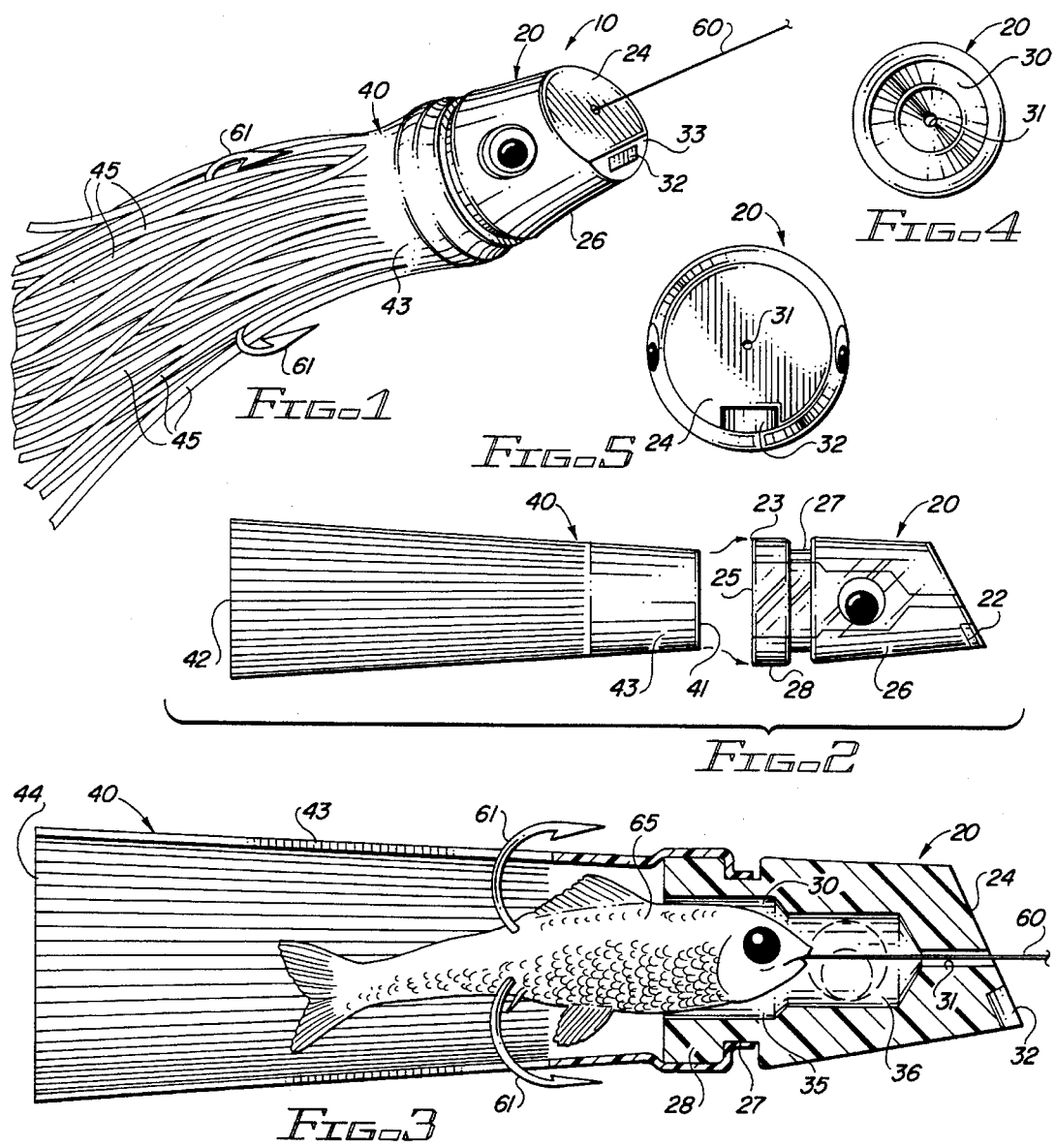
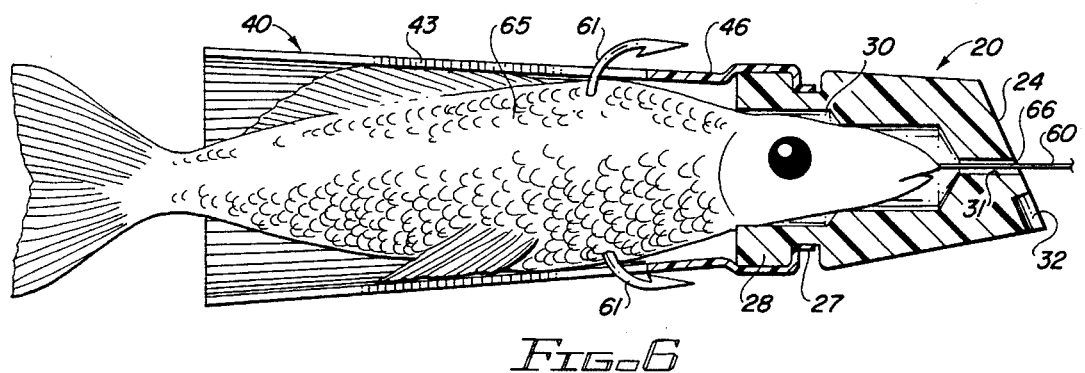

FISHING LURE HEAD

This is a continuation-in-part application of pending application Ser. No. 08/092,827 filed on Jul. 19, 1993, now abandoned.

BACKGROUND OF THE INVENTION

1. Field of the Invention

The present invention relates to an improved fishing lure head adapted to provide a realistic appearance and having an interchangeable skirt which enables the appearance of the lure to be varied as necessary, the lure adapted to be utilized with a bait fish.

2. Description of the Related Art

Numerous different types of lures are utilized in the sport of fishing, the individual lures generally being selected because of their appearance and the effect of that appearance on a fish which is sought after. A fishing technique most often utilized involves trolling wherein a fishing line, and attached lure, is cast from a boat and the boat continues to move, pulling the lure along. The primary objective of this technique is to cause the lure to look most like a real fish. Further, the color and size of the lure are highly important factors relating to the type of fish sought after. Known in the art are numerous types of fishing lures including rigid acrylic heads and having flexible rubber skirts extending therefrom. These rubber skirts are preferably removable such that a new skirt, which determines the color and appearance of the lure, be utilized. Generally, a fishing line is passed through these lures such that the fishing hook trails from the end thereof. As a first attraction to catching the fish, bait fish are often secured to the hook which trails at the end of the fishing lure, the bait fish leaving behind a scent, blood, or pieces thereof which increase the attraction of fish to the lure. Unfortunately, when trolling, the natural movement of the lure passing through the water results in the disintegration of the bait fish secured to the hook and inevitably results in the complete loss of the bait fish from the hook. Due to this disintegration of the bait fish, trolling for extended periods of time without pulling a line and securing a new bait fish could not be achieved. For example, it is common during trolling for the bait fish to disintegrate within thirty minutes and as a result, many bait fish must be brought and used during one fishing expedition.

It would be highly advantageous to the utilization of fishing lures to enable a bait fish secured thereto to be utilized for extended periods of time, thereby minimizing the quantity of bait fish which must be utilized and maximizing the amount of time during which the lures are active and effective. The fishing lure of the present invention is designed specifically to enable this prolonged use of bait fish. The lure of the present invention is adapted to receive and protect a bait fish therein such that the bait fish will serve its intended purpose and be exposed to the water, releasing its odor, small particulates, and the like, while being protected during its passage through the water. Further, the lure of the present invention includes an interchangeable skirt to enable the colorization and appearance of a single lure to be varied as necessary.

SUMMARY OF THE INVENTION

The present invention relates to a fishing head lure adapted to be utilized to aide in the catching of fish. The fishing lure of the present invention includes primarily a head formed of a substantially strong, solid, yet lightweight material, such as one of plastic or rubbery material. The head, which includes a proximal end and a distal end, includes a front face at the proximal end, a rear face at the distal end, and a surrounding side wall surface forming the body thereof. Disposed in the surrounding side wall surface of the head, at a point substantially adjacent the distal end of the head is a surrounding channel. The surrounding channel provides a reduced exterior diameter portion of the head and defines a lip at the distal end of the head. Additionally, an axial bore extends through the rear face substantially into the head. The axial bore is substantially large and is adapted to snugly receive a bait fish at least partially therein. Extending from the front face to the axial bore in the head is a small axial opening. The small axial opening is adapted to enable the passage of a fishing line therethrough, the fishing line extending through the axial opening such that a hook attached to the fishing line will extend behind the head. Further included as part of the fishing lure is an elongate skirt formed of a substantially flexible, resilient, durable material. The skirt, which includes a front end, a rear end, and a surrounding wall surface, includes an axial channel extending from the front face to the rear. The axial channel defines an interior diameter of the skirt at the front end thereof, that interior diameter being substantially equivalent to an outside diameter of the head at the surrounding channel of the head. The diameter of the skirt and resilient construction thereof enables the front end of the skirt to be extended over the head and into the surrounding channel of the head so as to removably yet securely engage the front end of the skirt about the distal end of the head. So as to provide additional protection to a bait fish inserted into the axial bore of the head, the skirt is adapted to surround the bait fish further protecting it during use and making the bait fish useable for extended periods of time.

An object of the present invention is to provide a head fishing lure which is adapted specifically to protect and shield a bait fish utilized therewith such that the bait fish will be substantially protected during use and accordingly be useable for an extended period of time.

Yet another object of the present invention is to provide a head fishing lure which snugly embraces a head portion of a bait fish thereby allowing the head fishing lure and bait fish to appear as one when traveling through water and its waves.

Another object of the present invention is to provide a head fishing lure which substantially protects the bait fish and which minimizes the disintegration of the bait fish during trolling at normal and higher speeds.

An advantage of the present invention is that because the bait fish is protected during use, it can be used during trolling for bigger fish for an extended period of time, such as well over an hour or more.

An advantage of the present invention is that because the bait fish is protected during use, less bait fish is needed and more time is spent actually fishing.

Yet another object of the present invention is to provide a head fishing lure which will provide an appearance during use which is substantially similar to that of a live fish.

It is a further object of the present invention to provide a head fishing lure which includes an interchangeable skirt to enable the appearance and colorization of the lure to be varied as necessary.

Yet another object of the present invention is to provide a head fishing lure and interchangeable skirt which can be quickly and easily removed and replaced with another skirt.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the improved fishing lure head in use.

FIG. 2 is an side elevation view of the improved fishing lure head.

FIG. 3 is a cross-sectional view of the head fishing lure and illustrates a bait fish hooked on the lure.

FIG. 4 is a rear plan view of the head of improved fishing lure.

FIG. 5 is a front elevation view of the head of the improved fishing lure.

FIG. 6 is a cross sectional view of the improved fishing lure head and illustrates a bait fish hooked on the lure in a preferred form for use.

Like reference numerals refer to like parts throughout the several views of the drawings.

DETAILED DESCRIPTION OF THE PREFERRED EMBODIMENT

Shown throughout FIGS. 1–5, the present invention is directed towards an improved fishing lure, generally indicated as 10. The improved fishing lure 10 is primarily adapted for catching larger game fish and is adapted to have a color and appearance which attracts specific, desired types of game fish. The lure 10, as best illustrated in FIG. 2, includes primarily a head 20 and a skirt 40. The head 20 is preferably formed of a substantially strong, solid, yet lightweight material such as an acrylic or other rubbery material such that it will be longlasting and substantially buoyant during use. The head 20, which has a proximal end 22 and a distal end 23 includes primarily a front face 24 at the proximal end 22, a rear face 25 at the distal end 23, and a surrounding side wall surface 26 forming the body of the head 20. Preferably, the head 20 includes a cylindrical shape. Included within the surrounding side wall surface 26 at a point substantially adjacent the distal end 23 of the head 20 is a surrounding channel 27. The surrounding channel 27 provides a reduced diameter portion of the head 20 and accordingly defines a lip 28 at the distal end 23 of the head 20. In a preferred embodiment and as shown in FIG. 6, cylindrical head 20 includes at least a slight taper in that side wall surface 26 is seen to have a smaller axial diameter at proximal end 22 than at region 21 which is adjacent surrounding channel 27. Distal end 23 of the head 20 can be made to include a side wall surface 26 having the same axial diameter as region 21, or if desired, can be made with a larger axial diameter than region 21.

As detailed in FIGS. 3 and 6, the head 20 includes an axial bore 30 extending through the rear face 25 of the head 20 into the head 20. The bore 30, which extends substantially into the head 20 is specifically adapted to receive a bait fish 65 at least partially therein. The bait fish 65, which can be any kind of fish desired by a user, is adapted to provide a smell, blood, and other particulates which make the lure 10 substantially more realistic. In the preferred embodiment, interior diameter of bore 30 is sized and structured to receive and snugly embrace a substantial portion of the head of the bait fish being used with the lure. As shown in FIG. 6, it is seen that most preferably the bore of the fishing lure head will be closely related in size to the size of the bait fish head being inserted therein. In FIG. 6 for example, a commonly used type of bait fish known as a "bally-hoo" has been depicted, the head portion of which fits snugly within axial bore 30, and which has a long thin "needle" type of nose 66 that can even be inserted through small axial opening 31, described below. This snug fit between bait fish 65 and the bore 30 of this invention is an improvement in the art because it allows the lure to essentially look as though it and the fish have become one during travel through the water. Another reason this is an improvement is that the crashing effect of the waves as they hit the assembled bait and lure during trolling, has minimal impact. That is, when the bait fish and lure are not snugly fit together as in other devices, each wave causes the head of the bait fish to collide with the lure head and then as the wave passes, causes the head and lure to separate. Because this action occurs repeatedly with each wave, it results in the rapid disintegration of the bait fish. On the other hand, applicant's improved fishing lure device as taught herein, solves that problem by allowing the bait fish and the lure to essentially become one as they travel through the water. Axial bore 30 may include two portions, namely a larger portion 35 and an intermediate portion 36. As shown in FIG. 6, intermediate portion 36 snugly receives the mouth of bait fish 65 while larger portion 35 snugly receives the head portion of the bait fish. It will be appreciated however that the axial bore could function with less than or more than two interior portions.

Additionally included in the head 20 is a substantially small axial opening 31. The axial opening 31 extends from the front face 24 through to the axial bore 30. The axial opening 31 is specifically adapted to enable the passage of a fishing line 60 therethrough. The fishing line 60 passes through the axial opening 31 such that the hooks 61 extend behind the head 20. In one alternative embodiment, a flattened head segment 33 may be included in the front face 24. In a preferred embodiment however, the front face 24 of the head 20 has a substantially angled orientation relative to the surrounding side wall surface 26 of the head 20 which enables the lure 10 to look more like a real fish while being pulled through the water during trolling.

In another preferred embodiment, the head 20 will include a notch 32 thereon. In the preferred embodiment, notch 32 as illustrated in FIGS. 3 and 5, is included in the front face 24 of the head 20 at a lower region thereof, and preferably, at a lower periphery thereof. Notch 32 helps the fishing lure head of this invention to point downwardly as it travels through the water during use, thereby imitating live fish which swim nose down and tail up. Notch 32 also assists with allowing the lure to have some movement from side to side when in use, which further imitates the swimming motion of a live fish. This is significant because an unnatural swimming position for a fish and/or lure is thought to intimidate the larger fish from biting.

The skirt 40 of the lure 10 is substantially elongate and is preferably formed of a flexible, resilient, durable material, preferably a rubber or latex material. The skirt 40, which includes a front end 41, a rear end 42, and a surrounding wall surface 43, also includes an axial channel 44 extending therethrough. The axial channel 44 extends from the front end 41 of the skirt 40 through to the rear end 42 of the skirt 40. The axial channel 44 defines an interior diameter of the skirt at its front end 41, the interior diameter of the skirt 40 being substantially equivalent to an outside diameter of the head 20 at the surrounding channel 27 thereof. Accordingly, the front end 41 of the skirt 40 must be stretched to pass over the head 20 and onto the channel 27 on the head 20, thereby providing a snug, secure, yet removable fit about the head 20. The skirt 40 is specifically adapted to surround the bait fish 61 which has been inserted into the axial bore 30 of the head 20. Since the bait fish 65 will often protrude from the head 20, the skirt 40 covers the protruding portions, thereby serving as a shield for the bait fish 65. As shown in FIG. 6, a preferred embodiment of skirt 40 covers the gill portion of bait fish 65 and thereby minimizes the amount of water passing into and out of the bait fish, which in turn minimizes the disintegration of the bait fish and maximizes its staying power while trolling. Such a shield for the bait fish 65 is necessary because when trolling at speeds of 9–10 knots, an unprotected bait fish will disintegrate, completely falling off a hook 61, and necessitating that a new bait fish 65 be added. By shielding the bait fish 65 with skirt 40, a single bait fish 65 can be utilized for an extended period of time without replacement.

The skirt 40, which also preferably has a cylindrical shape, includes a number of slits 45 disposed about a periphery thereof. These slits 45 are formed from surrounding side wall 43, and extend from skirt region 46, which substantially and preferably completely, covers the gill portion of bait fish 65, to the rear end 42 of the skirt 40. Slits 45 are adapted to be sufficiently elongate so as to enable portions of a skirt 40 to move about and become more attractive during use of the lure 10. Further, the slits 45 enable the hooks 61 to protrude from the axial channel 44 of the skirt 40 where they will more easily engage a fish to be caught.

Skirt 40, is specifically adapted to be easily fitted onto and removed from lure head 20 for replacement with another skirt. As has been explained, lure head 20 tapers from proximal end 22 to distal end 23. Skirt 40 can easily be fitted onto head 20 by sliding it over lure head face 24 and as it is pulled toward distal end 23, the tapered head stretches skirt 40 until its front end 41 slides into surrounding channel 27 of the head 20. As has been described, the interior diameter of axial channel 44 at front end 41 of the skirt is substantially equivalent to the exterior diameter of channel 27 and thus, skirt 40 remains snugly secured to head 20 during use of the lure and is not likely to be separated therefrom even when a fish strikes the bait. Occasionally however, a large toothy fish may damage the skirt upon striking and in such situations, the improved fishing lure head of this invention allows the skirt to be replaced quickly and easily while out trolling and without wasting much time. Specifically, skirt 40 can be removed from head 20 at distal end 23, by pulling the front end 41 thereof over the lip 28 on the head 20 and a new replacement skirt can be fit onto the head from proximal end 22, as described above. This can be done quickly and with relative ease because the fisherman does not need to remove the bait fish 65 nor the hooks 61 and line from head 20. Instead, the fisherman needs only to unsnap the snap swivel, which is known in the art for connecting the leader part of the line to the line on the reel, and can then easily slide new skirt 40 onto the leader part of the line and onto proximal end 22 of lure head 20, and pull it into the operative position as described above. The replaceable feature of skirt 40 saves a great deal of time and further, because skirt 40 can be interchanged easily, allows a new skirt 40 having a different color or configuration to be employed. The latter is important when for example, a fisherman has determined that a particular color is working best for attracting and causing fish to bite on a particular day.

Now that the invention has been described,
What is claimed is:

1. A head fishing lure comprising:

a head having a proximal end and a distal end, said head being formed of a substantially strong, solid, yet lightweight material, said head including a front face at said proximal end, a rear face at said distal end, and a surrounding side wall surface, said head further including a generally annular surrounding channel disposed within an exterior surface of said surrounding side wall surface at a point substantially adjacent to said distal end so as to define an external lip at said distal end of said head, an axial bore extending through said rear face of said head, said axial bore extending substantially into said head and being structured and disposed to snugly receive therein a bait fish at least partially therein, a substantially small axial opening extending from said front face of said head to said axial bore in said head, said axial opening being structured and disposed to enable passage of a fishing line therethrough, an elongate skirt, said skirt including a front end, and a rear end, and a surrounding side wall surface, and being formed of a substantially flexible, resilient, durable material, said skirt further including an axial channel extending from said front end of said skirt through to said rear end of said skirt, said axial channel defining an interior diameter of said skirt at said front end which is substantially equivalent to an outside diameter of said head at said surrounding channel thereof, such that said front end of said skirt extends over said lip on said head to said surrounding channel of said head thereby securely, yet removably engaging said front end of said skirt about said distal end of said head, and said skirt being structured and disposed to surround the bait fish inserted into said head such that the bait fish is substantially protected during use and is useable for an extended period of time.

2. A lure as recited in claim 1 wherein said skirt includes a plurality of slits disposed about a periphery of said surrounding wall surface of said skirt and extending from said rear end of said skirt.

3. A lure as recited in claim 1 wherein said head and said skirt each include a substantially cylindrical configuration.

4. A lure as recited in claim 1 wherein said front face of said head is flattened.

5. A lure as recited in claim 4 wherein said front face of said head includes a substantially angled orientation relative to said surrounding side wall surface of said head.

6. A lure as recited in claim 5 wherein said front face of said head includes a notch therein, said notch being structured and disposed to cause said head to point downward during use, thereby substantially imitating a real swimming fish.

7. A lure as recited in claim 4 wherein said front face of said head includes a notch therein, said notch being structured and disposed to cause said head to point downward during use, thereby substantially imitating a real swimming fish.

8. A lure as recited in claim 1 wherein said skirt includes a plurality of slits disposed about a periphery of said surrounding wall surface of said skirt and extending from a region adjacent said front end of said skirt to said rear end of said skirt.

9. A lure as recited in claim 1 wherein said axial bore comprises a large portion sized to snugly receive therein a head of the bait fish head and an intermediate portion sized to snugly receive therein the a mouth of the bait fish.

10. A head fishing lure comprising:

a head having a proximal end and a distal end, said head being formed of a substantially strong, solid, yet lightweight material, said head including a front face at said proximal end, a rear face at said distal end, and a surrounding side wall surface extending between said ends, said surrounding side wall surface having a smaller exterior diameter at said proximal end and a larger exterior diameter at said distal end, thereby tapering said head between said ends, said head further including a surrounding channel disposed in said surrounding side wall surface at a point substantially adjacent to said distal end so as to define a lip at said distal end of said head, an axial bore extending through said rear face of said head, said axial bore extending substantially into said head and being structured and disposed to receive a bait fish at least partially therein, a substantially small axial opening extending from said front face of said head to said axial bore in said head, said axial opening being structured and disposed to enable passage of a fishing line therethrough, an elongate skirt, said skirt including a front end, and a rear end, and a surrounding side wall surface, and being formed of a substantially flexible, resilient, durable material, said skirt further including an axial channel extending from said front end of said skirt through to said rear end of said skirt, said axial channel defining an interior diameter of said skirt at said front end which is substantially equivalent to an outside diameter of said head at said surrounding channel thereof, such that said front end of said skirt extends over said tapered head and into said surrounding channel of said head thereby securely, yet removably engaging said front end of said skirt about said distal end of said head, and said skirt being structured and disposed to substantially surround the bait fish inserted into said head such that the bait fish is substantially protected during use and is useable for an extended period of time.

11. A lure as recited in claim 10 wherein said skirt includes a plurality of slits disposed about a periphery of said surrounding wall surface of said skirt and extending from said rear end of said skirt.

12. A lure as recited in claim 10 wherein said head and said skirt each include a substantially cylindrical configuration.

13. A lure as recited in claim 10 wherein said front face of said head is flattened.

14. A lure as recited in claim 13 wherein said front face of said head includes a substantially angled orientation relative to said surrounding side wall surface of said head.

15. A lure as recited in claim 14 wherein said front face of said head includes a notch therein, said notch being structured and disposed to cause said head to point downward during use, thereby substantially imitating a real swimming fish.

16. A lure as recited in claim 13 wherein said front face of said head includes a notch therein, said notch being structured and disposed to cause said head to point downward during use, thereby substantially imitating a real swimming fish.

17. A lure as recited in claim 10 wherein said skirt includes a plurality of slits disposed about a periphery of said surrounding wall surface of said skirt and extending from a region adjacent said front end of said skirt which at least substantially covers a gill portion of the bait fish to said rear end of said skirt.

18. A lure as recited in claim 10 wherein said axial bore comprises a large portion sized to snugly receive therein a head of the bait fish head and an intermediate portion sized to snugly receive therein the a mouth of the bait fish.

19. A head fishing lure comprising:

a head having a proximal end and a distal end, said head being formed of a substantially strong, solid, yet lightweight material, said head including a front face at said proximal end, a rear face at said distal end, and a surrounding side wall surface extending between said ends, said surrounding side wall surface having a smaller exterior diameter at said proximal end and a larger exterior diameter at said distal end, thereby tapering said head between said ends, said head further including a surrounding channel disposed in said surrounding side wall surface at a point substantially adjacent to said distal end so as to define a lip at said distal end of said head, an axial bore extending through said rear face of said head, said axial bore extending substantially into said head and being structured and disposed to receive a bait fish at least partially therein, and a substantially small axial opening extending from said front face of said head to said axial bore in said head, said axial opening being structured and disposed to enable passage of a fishing line therethrough.

* * * * *